United States Patent [19]

Searles et al.

[11] 4,143,336

[45] Mar. 6, 1979

[54] XENON BROMIDE (XEBR) EXCIMER LASER

[75] Inventors: Stuart K. Searles, Burke, Va.; George A. Hart, Levant, Me.

[73] Assignee: The United States of America as represented by the Secretary of the Navy, Washington, D.C.

[21] Appl. No.: 663,408

[22] Filed: Mar. 3, 1976

[51] Int. Cl.$^2$ .................................................. H01S 3/090
[52] U.S. Cl. .................................................. 331/94.5 G
[58] Field of Search .................... 331/94.5 G, 94.5 PE

[56] References Cited
PUBLICATIONS

Ewing et al., *Physical Review*, vol. 12, No. 1, Jul. 1975, pp. 129–132.

Velazco et al., *The Journal of Chemical Physics*, vol. 62, No. 5, Mar. 1, 1975, pp. 1990–1991.

*Primary Examiner*—William L. Sikes
*Assistant Examiner*—Marcus S. Rasco
*Attorney, Agent, or Firm*—R. S. Sciascia; Philip Schneider; Melvin L. Crane

[57] ABSTRACT

A Xenon Bromide (XeBr) excimer laser is made by electron beam excitation over a range of from 10–3000 torr xenon with 0.5–4% $Br_2$. Xe* generated by a high-energy electron beam reacts with $Br_2$ to produce XeBr* which undergoes a bound-free transition resulting in stimulated emission on the transition XeBr*→Xe + Br + hv (230–360 nm) where* represents a low lying electronically excited state.

7 Claims, 2 Drawing Figures

XENON BROMIDE (XEBR) EXCIMER LASER

BACKGROUND OF THE INVENTION

This invention relates to rare gas and rare gas-additive lasers and more particularly to a Xenon Bromide excimer laser.

It is well known in the art that lasers of various types are in use and experimentation of new types are under study. Such lasers include solid state, chemical and gaseous types. Heretofore excimer lasers have been confined to stimulated emission from $Xe_2^*$, $Kr_2^*$, $Ar_2^*$, $XeO^*$ and $KrO^*$. The existance of a new class of excimers $RX^*$ where R is a rare gas atom, and X is a halogen atom have been set forth in the following articles (1) "Bound-free Emission Spectra of Diatomic Xenon Halides", by J. E. Velazco and D. W. Setser, *The Journal of Chemical Physics*, p. 1990, Vol. 62, No. 5, March 1, 1975; (2) "Vacuum UV Emission, from Reactions of Metastable Inert Gas Atoms: Chemiluminescence of ArO and ArCl", by M. F. Golde and B. A. Thrush, *Chemical Physics Letters*, 29, page 486, 1974.

SUMMARY OF THE INVENTION

A rare gas halide excimer laser in which Xenon Bromide is made by an electron-beam. The low lying excited electronic state of the Xe atom generated by the e-beam reacts with $Br_2$ to produce $XeBr^*$ which undergoes a bound-free transition with a wavelength of 281.8 nm.

DETAILED DESCRIPTION

Figure 1:
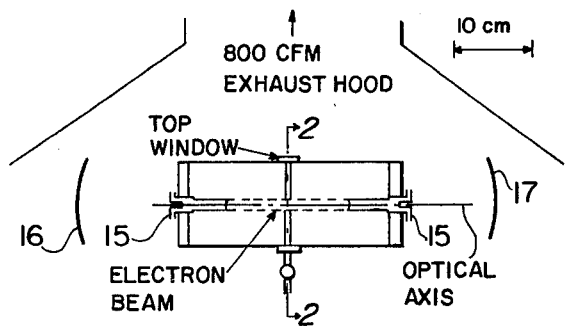
FIG. 1 illustrates a side view of a laser device.
Figure 2:
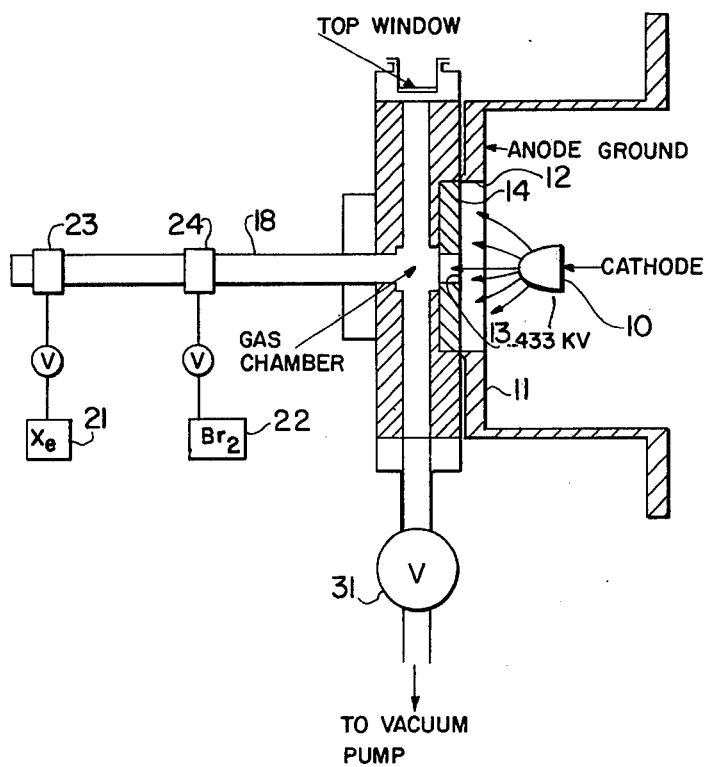
FIG. 2 is a cross sectional view of the device of FIG. 1 taken along line 2—2.

FIG. 1 includes an e-beam generator-laser cell such as used previously in laser emission of nitrogen mixtures such as set forth in prior publications, *Applied Physics Letters*, Vol. 25, No. 1, page 79, July 1974, *Applied Physics Letters*, Vol. 25, No. 12, page 735, Dec. 12, 1974, and described in an article "Stimulated Emission at 281.8 nm from XeBr", by S. K. Searles and G. A. Hart, *Applied Physics Letters*, Vol. 27, No. 4, page 243, August 15, 1975. FIG. 1 is a schematic drawing illustrating an e-beam diode in combination with a laser cell. The e-beam diode includes an axially aligned carbon cathode 10 in combination with a planar anode 11 spaced therefrom with a central opening 12 through which electrons are accelerated. The central opening is enclosed by a 37.5 μm thick Inconel 750-X foil 13 supported by a steel plate holder 14 secured to the anode across the opening therein. The steel plate includes either a slit or a plurality of holes therein through which the electrons pass. A slit provides increased pumping. A water filled folded Blumlein transmission line, or e-beam generator not shown, is used to energize the carbon cathode.

The laser housing is enclosed by normal incidence quartz windows 15 one at each end and the cavity includes at one end a 99% reflective mirror 16 and a 99% reflective mirror 17 spaced from the other end of the housing. The optical axis of the cavity extends through the center of the housing and the center of the mirrors. A gas inlet tube 18 connects with the gas supply so that the gas mixture is fed into the laser housing. The xenon gas from tank 21 bubbles through the bromine gas from tank 22 in which the gases mix together. The temperature of the gases may be controlled cyrogenically by any suitable means such as dry ice in holders 23 and 24 around the lines from tanks 21 and 22.

In carrying out the invention, the diode injects a 50-ns-long pulse of -433 kV electrons into the laser cell through the foil window to excite the gas mixture of Xe and $Br_2$. 99.995% pure Xe from a supply tank is condensed into a cold finger by which the Xe pressure is cryogenically controlled. $Br_2$ is condensed into a separate cold finger and thoroughly degassed. The $Br_2$ pressure is also cryogenically controlled. The gases are mixed turbulently and then admitted to the laser cell at a pressure of from 10 to 3000 torr. As the total gas pressure is increased, the fraction of the incident e-beam energy absorbed becomes larger. It has been determined that high-pressure operation provides the intense pumping needed to produce adequate gain on a bound-free transition and the largest over-all laser efficiency is achieved at high pressure about 500 torr.

In operation, the laser cell is evacuated by a suitable vacuum pump through valve 31 and the valve is then closed. The Xe and $Br_2$ gases are turbulently mixed and admitted into the gas chamber of the laser cavity at the desired pressure and temperature. The diode injects an electron pulse into the gaseous medium to excite the gas molecules. The kinetics of this laser are described by the following steps:

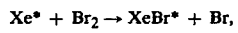

$Xe^*$ generated by a high-energy electron beam reacts with $Br_2$ to produce $XeBr^*$ which undergoes a bound-free transition with a wavelength of 281.8 nm.

The following operational example is given: With a 760 torr Xe — 3.8 torr $Br_2$ mixture and an e-beam as set forth above; a laser emission was observed in which the laser spectrum was less than 0.75 nm wide at 281.8 nm while the fluorescence was a banded continuum over the range 230–360 nm. The laser emission showed typical near-laser threshold behavior displaying a highly nonlinear dependence on the side emission. The gaseous mixture included Xenon with 0.5–4% $Br_2$. In this mixture range high pressure pumping is allowed where the e-beam is strongly absorbed.

Obviously many modifications are variations of the present invention are possible in light of the above teachings. It is therefore to be understood that within the scope of the appended claims the invention may be practiced otherwise than as specifically described.

What is claimed and desired to be secured by Letters Patent of the United States is:

1. A method of producing stiumlated emission at 281.8 nm from XeBr which comprises:
mixing Xe gas with a $Br_2$ gas;
admitting the mixed gases into a laser cavity at a pressure sufficient to produce stimulated emission;
exciting said mixed gas by an electron beam normal therewith to produce stimulated emission on the transition

2. A method as claimed in claim 1, wherein;
said Xe is 99.995% pure.
3. A method as claimed in claim 1, wherein:

said gas mixture comprises from 0.5–4% $Br_2$.

4. A method as claimed in claim 3, wherein;
the pressure of said mixed gases in said cavity is from 10–3000 torr.

5. A method as claimed in claim 3, wherein;
prior to mixing said gases;
said Xe gas is condensed into a cold finger from a supply tank, and;
said $Br_2$ is placed into a separate cold finger and thoroughly degassed;
whereby the temperature of said gases are controlled cryogenically.

6. A Xenon Bromide excimer laser which comprises:
an electron excitation means for generating a high energy electron beam;
a laser cavity with its optical axis transverse to the electron beam generated by said electron excitation means;
a gaseous mixture of Xe and $Br_2$ in said laser cavity;
said $Br_2$ forming from 0.1–4% of said mixture.

7. A Xenon Bromide excimer laser as claimed in claim 6, in which;
said gaseous mixture in said laser cavity has a total pressure of from 10 to 3000 torr.

* * * * *